(12) United States Patent
Ampuero

(10) Patent No.: US 9,441,536 B2
(45) Date of Patent: Sep. 13, 2016

(54) INTERNAL COMBUSTION ENGINE

(76) Inventor: Larry Sydney Ampuero, Laja (CL)

( * ) Notice: Subject to any disclaimer, the term of this patent is extended or adjusted under 35 U.S.C. 154(b) by 829 days.

(21) Appl. No.: 13/805,521

(22) PCT Filed: Jul. 6, 2010

(86) PCT No.: PCT/IB2010/053099
§ 371 (c)(1),
(2), (4) Date: Apr. 1, 2013

(87) PCT Pub. No.: WO2012/004630
PCT Pub. Date: Jan. 12, 2012

(65) Prior Publication Data
US 2013/0206099 A1   Aug. 15, 2013

(51) Int. Cl.
*F01B 3/04*  (2006.01)
*F02B 55/00*  (2006.01)
*F01B 9/06*  (2006.01)
*F02B 57/10*  (2006.01)

(52) U.S. Cl.
CPC ............ *F02B 55/00* (2013.01); *F01B 9/06* (2013.01); *F02B 57/10* (2013.01)

(58) Field of Classification Search
CPC ........ F02B 55/00; F02B 57/10; F02B 57/08; F01B 9/06
USPC ...... 123/44 E, 45 R, 43 A, 43 C, 44 R, 44 D
See application file for complete search history.

(56) References Cited

U.S. PATENT DOCUMENTS

| | | | |
|---|---|---|---|
| 1,587,343 A | 6/1926 | Hermann | |
| 1,853,563 A | 4/1932 | Hungerford et al. | |
| 3,452,723 A * | 7/1969 | Keylwert | F02B 53/00 418/186 |
| 3,754,535 A * | 8/1973 | Hofbauer | F02B 53/00 123/209 |
| 3,762,840 A * | 10/1973 | Merz | F02B 53/00 418/15 |
| 3,762,842 A * | 10/1973 | George, Jr. | F02B 53/00 418/61.2 |
| 3,931,810 A | 1/1976 | McGathey | |
| 3,949,712 A * | 4/1976 | Thaler | F02B 53/02 123/228 |
| 6,014,791 A * | 1/2000 | Nosenchuck | F04C 2/22 418/122 |
| 2008/0121207 A1* | 5/2008 | Pelov | F02B 57/08 123/213 |
| 2013/0081591 A1* | 4/2013 | Cruz | F02B 55/14 123/243 |

(Continued)

FOREIGN PATENT DOCUMENTS

| ES | 439452 | 9/1997 |
|---|---|---|
| GB | 191502702 | 2/1916 |

(Continued)

OTHER PUBLICATIONS

International Search Report for International Application No. PCT/IB2010/053099 mailed Mar. 4, 2011.

*Primary Examiner* — Nicholas J Weiss
*Assistant Examiner* — Ngoc T Nguyen
(74) *Attorney, Agent, or Firm* — Merchant & Gould P.C.

(57) ABSTRACT

An internal combustion engine comprising a rotor comprising a block (2), a drive shaft (5) and at least one piston set (1), all of them jointly rotating, wherein said piston set (1) is radially located with respect to the drive shaft (5); and a stator comprising a carcass (21), a first and second rotating support means (18, 19), and a first and second attachment means (17, 23); wherein the carcass (21) has guides (6) on its internal surface, which delimit the trajectory of each piston set; and wherein the inner end of the piston set (1) comprises a piston head (15) located inside the block (2), delimiting a combustion chamber, while at its outer end said piston set (1) contacts the guides (6).

15 Claims, 2 Drawing Sheets

(56) References Cited

U.S. PATENT DOCUMENTS

| | | | |
|---|---|---|---|
| 2013/0133613 A1* | 5/2013 | Domit | F02B 53/04 123/210 |
| 2015/0159653 A1* | 6/2015 | Forni | F04C 29/0057 418/55.5 |

FOREIGN PATENT DOCUMENTS

| | | | |
|---|---|---|---|
| GB | 734103 A * | 7/1955 | F16C 35/10 |
| GB | 1109374 | 4/1968 | |
| GB | 1519966 | 8/1978 | |
| JP | 59043925 | 3/1984 | |
| SU | 1515264 A1 * | 10/1989 | |

* cited by examiner

INTERNAL COMBUSTION ENGINE

This application is a National Stage Application of PCT/IB2010/053099, filed 6 Jul. 2010 which application is incorporated herein by reference. To the extent appropriate, a claim of priority is made to the above disclosed application.

FIELD OF APPLICATION

The present invention is directed to internal combustion engines, particularly to an internal combustion engine that is a hybrid between a Wankel engine and an Otto or Diesel engine, which simplifies its functioning by eliminating the use of moving elements, such as a crankshaft, camshaft, gears, drive belts, distributor and the like.

BACKGROUND OF THE INVENTION

Currently, internal combustion engines require moving elements for functioning, which synchronize the fuel admission and gas exhaust systems through piston movement. Currently, these systems have been perfected with the incorporation of elements to optimize fuel use and motor control, but they still use a large number of moving pieces, which indeed require a considerable use of energy. An engine type presenting a solution to this problem is the Wankel internal combustion engine, which has not been used due to the durability difficulties presented.

For instance, patent GB1109374 discloses a Wankel internal combustion engine with a rotating piston that comprises a housing having an inner peripheral surface and a three-sided rotating piston that sequentially shifts between three variable-volume working chambers, which define the admission, compression, expansion and exhaust phases; wherein said engine also includes a groove-shaped transference passage that controls the transference through a slide. Some moment before the end of the expansion phase of the first chamber, some of the hot combustion gases pass to the second chamber to start the compression phase, thereby increasing the compression rate beyond that determined by the engine dimensions. The transferred hot gases complement the compression heat to allow the ignition and combustion of the fuel injected through a nozzle when operating under a diesel cycle. The amount of feedback gas per groove cross-section depends on the engine rate. Hence, the higher the rate, the lower the time the groove is open and therefore the lower the amount of gas in the feedback. To counteract this in order to keep substantially constant the amount of feedback gas independently of the engine rate, the slide is controlled by a rate regulator in such a way as to decrease the feedback gas amount at low rates and increase it at high rates. If the engine operates in an Otto spark-ignition cycle, the slide can be fully moved to the inner part or a filling member can be inserted in the groove.

The Wankel engine as described in patent GB1109374 has important advantages with respect to the Otto engine, such as, for instance, the use of fewer moving pieces, which generates a higher reliability. Furthermore, this engine has a higher running smoothness since the delivery of potency is carried out in a more progressive way. Finally, this type of engine has a lower weight due to the lower number of pieces that compose the engine in comparison with piston engines.

However, as previously mentioned, a Wankel engine, such as the engine of patent GB1109374, has durability and other disadvantages and therefore this type of engine has not been used extensively in the industry. Some of these disadvantages are:

Emissions: this engine has high emission levels due to the geometry of its combustion chambers, which makes it difficult to comply with contaminant emission regulations.

Consumption: the thermodynamic efficiency is reduced by the elongated shape of the combustion chambers and the low compression ratio.

Difficult hermeticity: It is very difficult to isolate each of the three sections of the rotating cylinder, which have to be mutually hermetic for a good operation. Besides, it is necessary to change the hermeticity system approximately every 6 years due to excess wear.

In this way, although the existing solutions in the state of the art try to improve said engines by making them more efficient and economic, there is currently no solution able to counteract substantially the aforementioned problems with respect to both engines. With the aim of solving the previously exposed disadvantages, this invention presents an internal combustion engine that uses the Wankel engine operation principles using combustion chambers similar to those of the Otto or Diesel engines. This engine is able to improve aspects of the Otto and the Diesel engines with respect to the number of moving pieces, running smoothness and weight, by using the Wankel engine operation principle. Likewise, the engine of the present invention is able to improve the contaminant gas emission level, decrease the consumption and overcome the hermeticity problems associated with the Wankel engine, by using the combustion chambers of an Otto or Diesel engine.

The internal combustion motor of the present invention does not require a crankshaft, valves, camshaft, cams, belts, valve springs, synchronization and distribution systems and the like. Furthermore, the present engine performs a four-stroke Otto or Diesel cycle in a single rotation of its potency axle, which allows for the use of a single spark plug or injector, depending on the type of fuel for which the system is designed.

Therefore, an internal combustion engine is provided that uses only one rotation of its potency axle to generate the four strokes of an Otto or Diesel cycle through four lineal displacements of a piston, which can operate with all types of fuel and can be used in all classes of vehicles, machines, and mobile or stationary equipment, complementing the benefits of a Wankel engine with the durability of an Otto or Diesel engine.

The engine of the present invention is formed basically by a rotor in which the amount of cylinders required according to the design is equidistantly and radially located. The rotor comprises a drive shaft supported on two rotary supporting means located at the center of two ends of a housing.

The piston sets radially shift from the center to the periphery of the rotor due to the combustion of the fuel. Each piston set comprises a piston head located in a rotor cylinder and in the external surface of said piston head a supporting bar protrudes, said supporting bar comprising at its outer end a displacement shaft perpendicularly joined to said supporting bar. This displacement shaft has two displacement means, e.g. bearings, one in each end, which are in contact with guides located at each side of the engine housing. In this way, the guides are designed to generate an angle with respect to the piston displacement direction, which causes the rotor to rotate when the piston shifts outwards.

Furthermore, the housing connects each cylinder in the right moment to an admission way and subsequently to one or more exhaust ways through slots or channels concentrically molded thereon.

BRIEF DESCRIPTION OF THE DRAWINGS

In order to get a better understanding of the invention, this will be described with the aid of FIGS. 1, 2, 3 and 4, which

DETAILED DESCRIPTION OF THE INVENTION

Figure 1:
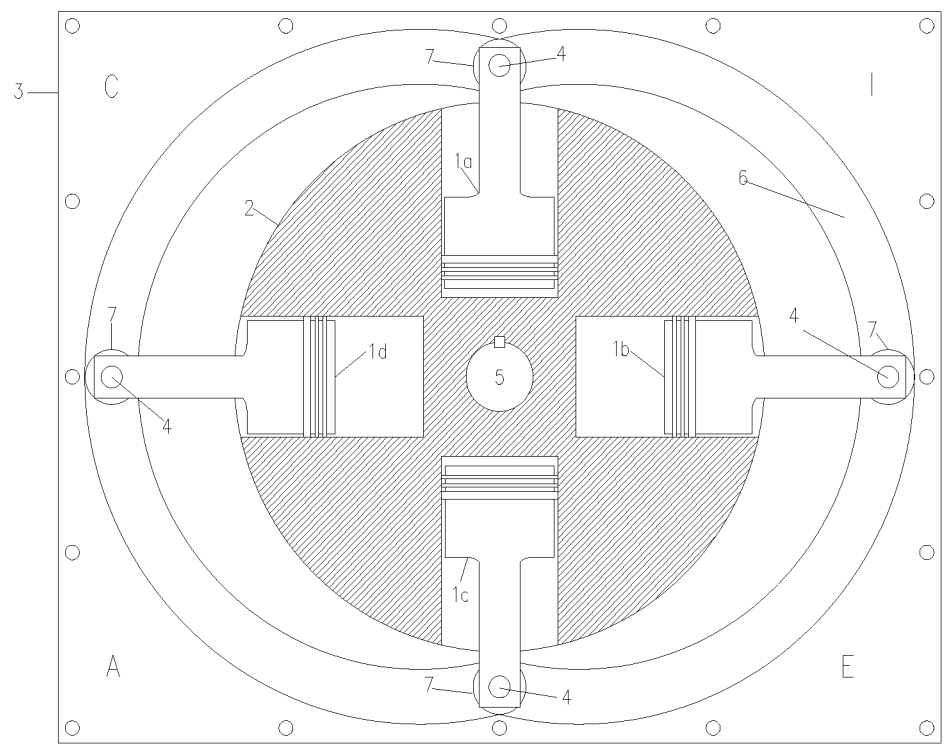
FIG. 1 shows a front cross view of an engine model in which four cylinders are used.
Figure 2:
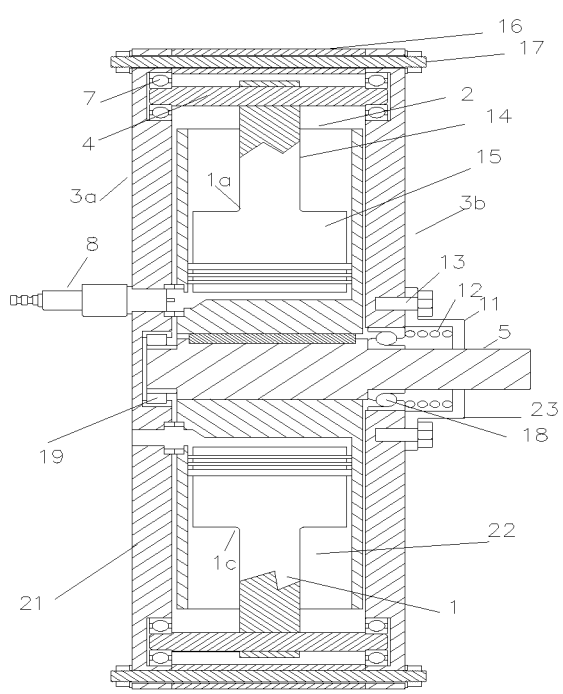
FIG. 2 shows a side cross view of the engine model presented in FIG. 1.

An internal combustion engine is presented in FIG. 1 comprising a rotor, constituted by a block (2) that houses cylinders (22) inside which the four strokes of the Otto or Diesel cycle will be generated, and also imparts the necessary stability to the drive shaft (5) rotation thanks to the inertia associated to its mass. Said rotor comprises the drive shaft (5) and at least one piston set (1), all of them jointly rotating, wherein said piston set (1) is radially located with respect to the drive shaft (5).

The engine also has a stator comprising a housing (21), a first and second rotary supporting means (18, 19), and a first and second attachment means (17, 23); wherein said housing (21) has two opposing guides (6) on its internal surfaces that define a trajectory that orients the displacement of an end of the piston set (1).

Additionally, the inner end of the piston set (1) comprises a piston head (15) located inside the cylinder (22) of the block (2) and delimits a combustion chamber inside said block (2), while at the outer end of said piston set (1) the displacement means (7) contact the guides (6).

Figure 3:
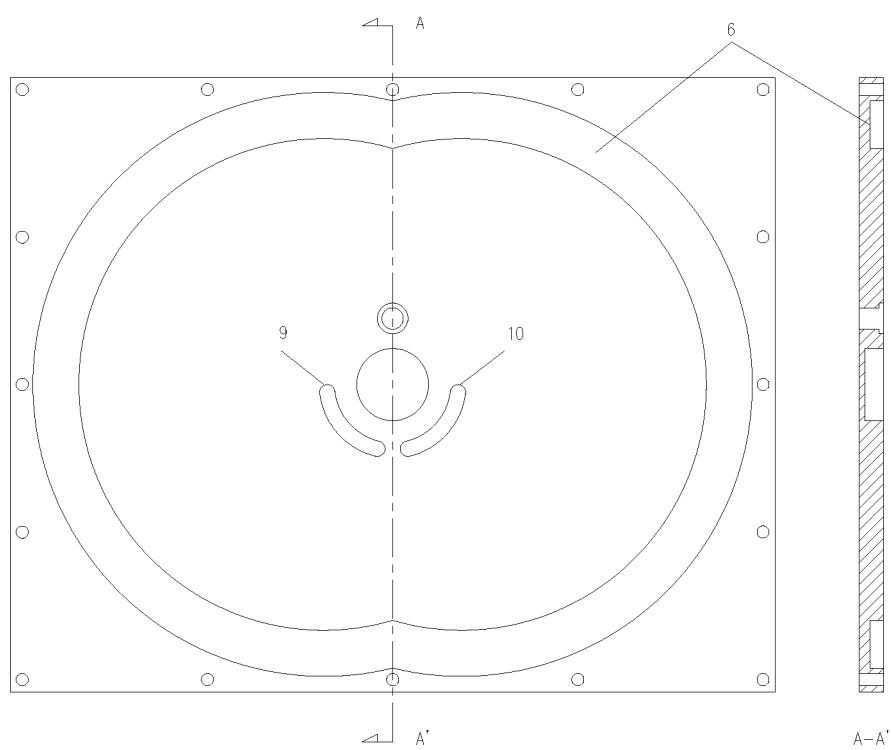
FIG. 3 shows a top view and a cross view of the front wall.
Figure 4:
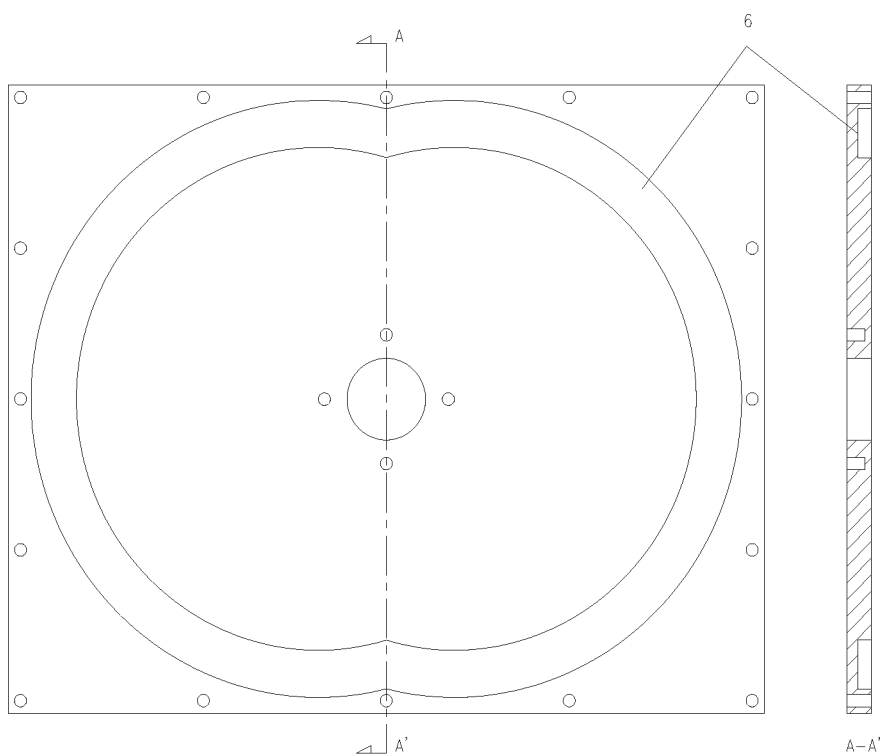
FIG. 4 shows a top view and a cross view of the rear wall.

In a preferred configuration, the guides (6) define a trajectory in the form of two superimposed circles with distant centers, as can be observed in FIGS. 3 and 4. However, it is worth mentioning that other geometries could be used for these guides (6) as long as said guides fulfill the function of guiding the displacement of the piston set (1) at its outer end. Particularly, in the combustion gas admission stage it is only necessary that the piston set (1) shifts to the outer section of the block (2), which can be achieved by a spring located between said piston set (1) and the rotor (2), thus replacing the guide segment (6).

Furthermore, said guides are recesses on the surface, but could also be notches, slots or any other similar geometry that fulfills the requirement of directing the trajectory of pistons, causing in this way the rotation of the rotor through the radial displacement of said pistons. Additionally, the width of the guide recesses corresponds to the diameter of the displacement means (7), wherein said displacement means (7) are located and can slide inside the guides (6).

Similarly, in a preferred configuration, the block (2) has a cylindrical shape, although it could have any shape that suitably fulfill the function of housing as many cylinders (22) as required by the design. Additionally, the block (2) has a perforation in its center to house the drive shaft (5), said drive shaft (5) being attached to said block (2) by a pin (20) as shown in FIG. 1.

Each piston set (1) has a piston head (15) in contact with the combustion chamber and a support bar (14) affixed to the external surface of the piston head (15) and located perpendicularly to said piston head (15), which replaces the connecting rod of conventional pistons. Additionally, a displacement shaft (4) is rigidly and perpendicularly attached to the outer end of said support bar (14), which in turn has two displacement means (7), such as bearings, at both ends, in contact with the guides (6) and in charge of making possible the joint movement of the piston set (1) along the desired trajectory. In this way, the engine could have as many piston sets (1) as required according to design, wherein each piston set will be radially located with respect to the drive shaft of the engine.

The housing has a preferred configuration with two opposing walls (3a, 3b) joined by a first attachment means (17), wherein each wall (3a, 3b) has on its inner surface the guides (6) delimiting the trajectory that directs the displacement of a piston set (1) end.

In this way, the housing (21) has, as previously described, a first and a second rotary supporting means (18, 19), which could be bushing or bearings according to design requirements, wherein each of them is attached to each wall (3a, 3b) of the housing (21) and the rotor drive shaft (5) is supported on them.

Both walls (3a, 3b) are joined together by a frame (16) and are joined to said frame by a first attachment means (17); said attachment means can be bolts, welding, or any type of device to suitably join both walls.

Furthermore, although a preferred configuration of the invention comprises two opposing walls, the housing could also comprise casks or any type of pieces that fulfills the function of suitably housing the guides (6) and the rotary supporting means (18, 19).

The front wall (3a) comprises two ducts (9, 10) that fluidly connect the combustion chamber with the external environment, which have concentric arc section shapes, wherein each duct spans an angle slightly lower than 90°, being each of them the admission and exhaust way for each cylinder. In this way, said angle together with the rotation rate of the engine determines the time each combustion chamber will be in direct contact with the external environment, both for gas admission and exhaust. Besides, said wall (3a) has another perforation that houses the spark plug or the injector, depending on the nature of the used fuel (gasoline or diesel), wherein said perforation is on the central axis (A-A'), on the top of the wall, just at the beginning of the piston working path.

Additionally, according to FIG. 4, the rear wall has two perforations that are equidistant from the center thereof, conceived to house the second attachment means (23). In a preferred configuration, said means corresponds to a set comprising four bolts (13), a flange (11) and a spring (12); the flange has the function of compressing the spring (12) through its inner surface, thus pressing the second rotary supporting means (18), keeping said means well positioned and providing in this way the pressure required to generate the necessary hermeticity between the rotor (2) and the rear wall (3b).

In this way, FIG. 1 shows a four-stroke engine where the pistons are in the stages indicated as follows:

Piston 1 a: beginning of the ignition stage (I);
Piston 1 b: beginning of the exhaust stage (E);
Piston 1 c: beginning of the admission stage (A); and
Piston 1 d: beginning of the compression stage (C).

According to the foregoing description, only a small clockwise rotation together with a spark or the injection of fuel (depending on the fuel being gasoline or diesel) is required to initiate combustion in piston 1 a. The pressure generated inside the chamber pushes piston 1 a radially outwards to the outer part of the chamber. The piston has two displacement means (7) at its outer end that are in contact with the guides (6), which transforms the radial force in a circular force, according to the following trigonometric equation:

$$Fx=Fy*\tan\alpha$$

wherein:
Fx: is the force in a direction parallel to the guide direction in the contact point of the displacement means (7) with the guide (6). Fy: is the force in the radial direction (generated by combustion).
a: is the angle between the horizontal and the tangent to the guide (6) in the contact point with the displacement means (7).

The movement generated in this way is transmitted from the piston to the rotor. When piston 1 a reaches its maximal outer position (position B), the rotor has rotated 90° clockwise. The gas exhaust stage begins at this point, wherein gas exhaust is attained through the exhaust way (10) in the respective wall connecting the combustion chamber with the external environment; this stage takes another 90°. When the piston arrives at position C, it has pushed out all gasses when being pushed in turn inside the chamber by the guide (6). The admission stage is initiated at this point, wherein the fuel arrives into the combustion chamber through the admission way (9) in the respective wall (3a). The piston moves toward the outside of the chamber through the guide (6) until reaching position D. Here, the admission way is closed and the cylinder chamber remains hermetic, allowing the gas retained inside the chamber to be compressed by the piston, which is pushed in turn inside the chamber by the guide (6) until arriving back to position A, wherein a new cycle begins.

According to the previous description, the internal combustion engine of this invention does not require a crankshaft, valves, camshafts, cams, belts, valve springs, or synchronization and distribution systems, since all the cylinders perform the four-stroke cycle in a single rotation, thus allowing the use of a single spark plug or injector, depending on the type of fuel which the system is designed for.

Many changes, modifications and alterations can be applied to the base of the present invention. In this sense, it must be understood that the previous description and figures have an illustrative and not a limiting purpose. Therefore, the scope of the invention must be determined according to the contents of claims in the claim set.

The invention claimed is:
1. An internal combustion engine, wherein said internal combustion engine comprises:
   a rotor comprising a block, a drive shaft and at least one piston set, wherein the at least one piston set is radially located with respect to the drive shaft; and
   a stator comprising a housing, first and second rotary supporting means, and first and second attachment means;
   wherein the housing includes guides on its internal surfaces having the shape of two superimposed circles with distant centers, which delimit the trajectory of the at least one piston set;
   wherein an inner end of the piston set comprises a piston head located inside the block, delimiting a combustion chamber, while at its outer end said piston set contacts the guides; and
   wherein the second attachment means is a flange that clutches a spring in its internal surface to push the second rotary supporting means.
2. An internal combustion engine according to claim 1, wherein the block has a perforation located at the center of said block, with the drive shaft located in said perforation.
3. An internal combustion engine according to claim 1, wherein the guides are inner recesses in the internal surfaces of the housing.
4. An internal combustion engine according to claim 1 wherein the piston set has springs between said piston set and the rotor that force the displacement of the piston set during the admission stage.
5. An internal combustion engine according to claim 1, wherein each piston set comprises:
   a piston head;
   a supporting bar jointly moving with the piston head and positioned parallel to the piston head;
   a shaft perpendicularly joined to the outer end of the supporting bar; and
   two displacement means located one at each end of the shaft.
6. An internal combustion engine according to claim 5, wherein the at least one piston set comprises two or more piston sets arranged radially and equidistantly from each other.
7. An internal combustion engine according to claim 1, wherein the housing consists of a front wall, a rear wall and a frame, and wherein both walls are opposing each other and attached to the frame by the first attachment means.
8. An internal combustion engine according to claim 7 wherein the lids have perforations in their centers to house the first and second rotary supporting means.
9. An internal combustion engine according to claim 7, wherein the guides are included in the surface of each of the walls in the form of recesses, notches or slots delimiting the trajectory of each piston set.
10. An internal combustion engine according to claim 7, wherein the front wall comprises:
    a perforation to house a spark plug and/or injector; and
    a perforation to house the first rotary supporting means.
11. An internal combustion engine according to claim 7 wherein the rear wall has four perforations equidistant from the center thereof, which house four bolts that fasten the second attachment means.
12. An internal combustion engine according to claim 7, wherein the first attachment means are bolts attaching the walls to the frame.
13. An internal combustion engine according to claim 1 wherein the width of the guide recesses corresponds to the diameter of the displacement means, wherein said displacement means are located and can slide inside said guides.
14. An internal combustion engine according to claim 1, wherein the first and second rotary supporting means are bearings or bushings.
15. An internal combustion engine according to claim 1, wherein the intake and exhaust ports are in the form of two ducts that fluidly connect the combustion chamber with the external environment, both having an arc section shape, and arranged concentrically in a surface of the housing, wherein each duct spans an angle lower than 90°.

* * * * *